(12) United States Patent
Rolling et al.

(10) Patent No.: US 10,711,791 B1
(45) Date of Patent: Jul. 14, 2020

(54) DUAL MODE TURBOFAN ENGINE

(71) Applicant: Government of the United States as represented by the Secretary of the Air Force, Wright-Patterson AFB, OH (US)

(72) Inventors: August J Rolling, Dayton, OH (US); Jeffrey K Wood, Eagle, ID (US)

(73) Assignee: United States as represented by the Secretary of the Air Force, Wright-Patterson AFB, OH (US)

( * ) Notice: Subject to any disclaimer, the term of this patent is extended or adjusted under 35 U.S.C. 154(b) by 74 days.

(21) Appl. No.: 16/103,291

(22) Filed: Aug. 14, 2018

Related U.S. Application Data

(60) Continuation of application No. 15/722,621, filed on Oct. 2, 2017, now abandoned, which is a division of application No. 14/231,806, filed on Apr. 1, 2014, now abandoned.

(51) Int. Cl.
*F04D 27/00* (2006.01)

(52) U.S. Cl.
CPC .................................. *F04D 27/002* (2013.01)

(58) Field of Classification Search
CPC .......... F02K 3/062; F02K 3/065; F02K 3/075; F02C 3/067; F02C 3/10; F02C 3/13; F02C 7/36; F01D 15/10; B64C 11/48; Y02T 50/672
USPC ......... 415/17; 60/226.1, 268, 230, 324, 533; 416/129
See application file for complete search history.

(56) References Cited

U.S. PATENT DOCUMENTS

| | | |
|---|---|---|
| 2,198,475 A | 4/1940 | Dorner |
| 2,796,731 A | 6/1957 | Morley et al. |
| 3,044,557 A | 7/1962 | Posh |
| 4,598,543 A | 7/1986 | Brewer |
| 4,768,927 A | 9/1988 | Munk |
| 4,927,329 A | 5/1990 | Kilman et al. |
| 4,947,642 A | 8/1990 | Grieb et al. |

(Continued)

OTHER PUBLICATIONS

Flight Global. Printed Mar. 5, 2014. "Whatever Happened to Propfans?" http://www.flightglobal.com/news/articles/whatever-happened-to-propfans-214520/.

(Continued)

*Primary Examiner* — Patrick Hamo
*Assistant Examiner* — Paul W Thiede
(74) *Attorney, Agent, or Firm* — AFMCLO/JAZ; Jeffrey Moore

(57) ABSTRACT

A dual mode turbofan engine includes a jet engine portion having a compressor, a turbine disposed aft of the compressor, and a shaft coupled to the compressor and the turbine. The jet engine portion is configured to produce an exhaust. The system further includes an auxiliary turbine having a plurality of auxiliary turbine blades. The auxiliary turbine is disposed aft of the turbine and decoupled from the shaft. The system also includes a diverter disposed between the turbine and the auxiliary turbine. The diverter is configured to selectively direct the exhaust to an inner flow path bypassing the plurality of auxiliary turbine blades or to an outer flow path engaging the plurality of turbine blades. A plurality of propeller blades is hingedly connected to the auxiliary turbine.

9 Claims, 7 Drawing Sheets

(56) References Cited

U.S. PATENT DOCUMENTS

| | | | | |
|---|---|---|---|---|
| 5,079,916 | A | * | 1/1992 | Johnson .................. B64C 11/48 |
| | | | | 416/129 |
| 7,694,520 | B2 | | 4/2010 | Pekrul et al. |
| 2004/0079835 | A1 | * | 4/2004 | Volk .......................... B64C 9/22 |
| | | | | 244/76 C |
| 2009/0211222 | A1 | * | 8/2009 | Roberge .................... F02C 3/13 |
| | | | | 60/226.1 |
| 2011/0154805 | A1 | * | 6/2011 | Heathco .................. F01D 15/10 |
| | | | | 60/226.1 |
| 2011/0226174 | A1 | * | 9/2011 | Parks ........................ B60F 5/02 |
| | | | | 114/313 |
| 2012/0061522 | A1 | | 3/2012 | Sullivan et al. |
| 2012/0128493 | A1 | * | 5/2012 | Shelley .................. B64D 27/10 |
| | | | | 416/146 R |

OTHER PUBLICATIONS

Mario Asselin. 1997. An Introduction Aircraft Pertormance pp. 50-51. American Institute of Aeronautics and Astronautics, Inc. http://books.google.com/books?id=kaqvC4e_EKcC&pg=PA50&lpg=PA50&dq=cj805-23+engine&source=bl&ots=BJJ8tb_1Zy&sig=CgzXWEFyGM5Tws9EwhWsZGV6bn8&hl=en&sa=X&ei=JY44U4ayEsvKsASe44HYDw&ved=0CGMQ6AEwDg#v=onepage&q=cj805-23%20engine&f=false.

Egbert Torenbeek. 2013. "Advanced Aircraft Design" 2 pgs. John Wiley & Sons. http://books.google.com/books?id=C0gUyoYewhoC&pg=PT99&dq=GE+unducted+fan&hl=en&sa=X&ei=iZE4U62IGKjkOgG4poGoDw&ved=0CCEQ6AEwAQ#v=onepage&q=GE%20unducted%20fan&f=false.

* cited by examiner

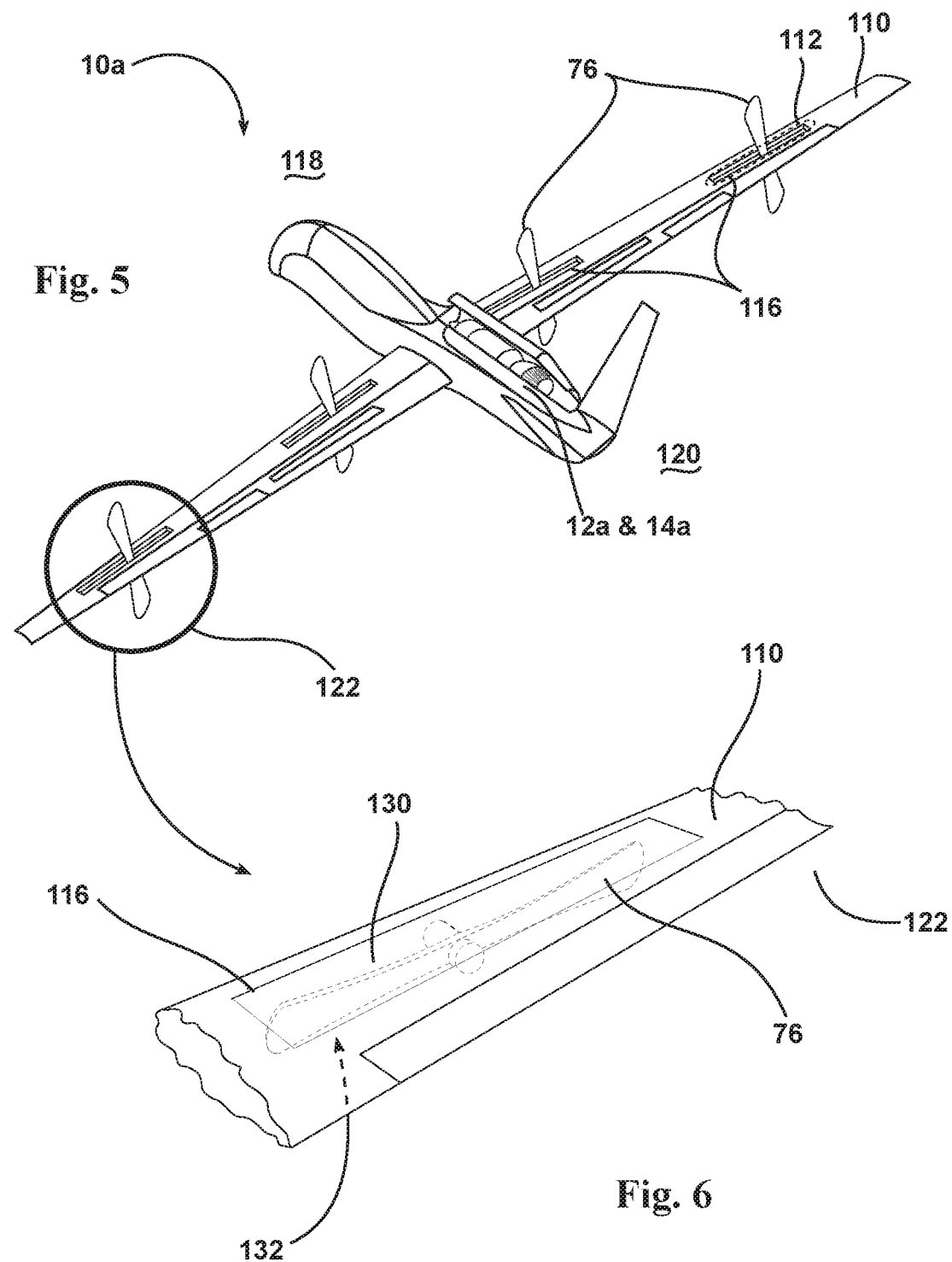

DUAL MODE TURBOFAN ENGINE

Pursuant to 37 C.F.R. § 1.78(a)(4), this application is a continuation of application Ser. No. 15/722,621, filed Oct. 2, 2017, which is a divisional of application Ser. No. 14/231,806, filed Apr. 1, 2014, which claims the benefit of and priority to prior filed Provisional Application Ser. No. 61/817,595 (AFD 1265), filed Apr. 30, 2013, and 61/817,429 (AFD 1266 and AFD 1267), filed Apr. 30, 2013, all of which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to high efficiency jet engines and, more particularly, to dual mode jet engines.

BACKGROUND OF THE INVENTION

The turbojet or low-bypass turbofan engine provides a large amount of jet thrust but at a relatively high fuel penalty. Turbofan embodiments, wherein a ducted fan is used to direct bypass propulsive air around the periphery of the jet core, provide good efficiency at cruise velocities but poor performance at relatively high or low speeds. Further, propeller based propulsion (to include, turbo props and un-ducted propfans) allows for reduced fuel consumption when an airframe is traveling at fairly low speeds.

As a general proposition, an engine is most efficient when the exit velocity of the propulsive system is closely matched to the forward motion of the airframe. In the previously noted examples, each engine excels at a specific purpose and they are tailored for flight conditions pertaining to that purpose. However, many military airframes have a spectrum of mission profiles in which it would be advantageous to possess both the increased mass flow exit velocity of a turbojet engine during one mission leg and improved fuel economy and propulsive efficiency during another leg.

Therefore, a need exists for an improved dual mode turbofan engine capable of selectively switching between turbofan and prop driven configurations in response to operating conditions, environmental conditions, or operator selection.

SUMMARY OF THE INVENTION

The present invention overcomes the foregoing problems and other shortcomings, drawbacks, and challenges of designing an engine capable of producing optimal fuel efficiency performance under a variety of operating conditions.

According to one embodiment of the present invention, a dual mode turbofan engine system is provided. The engine system includes a jet engine portion having a compressor, a turbine disposed aft of the compressor, and a shaft coupled to the compressor and the turbine. The jet engine portion is configured to produce an exhaust. The system further includes an auxiliary turbine having a plurality of auxiliary turbine blades. The auxiliary turbine is disposed aft of the turbine and decoupled from the shaft. The system also includes a diverter disposed between the turbine and the auxiliary turbine. The diverter is configured to selectively direct the exhaust to an inner flow path bypassing the plurality of auxiliary turbine blades or to an outer flow path engaging the plurality of turbine blades. A plurality of propeller blades is hingedly connected to the auxiliary turbine.

According to another embodiment of the disclosed invention, a dual mode turbofan engine system is provided. The engine system includes a jet engine portion having a compressor, a turbine disposed aft of the compressor, and a shaft coupled to the compressor and the turbine. The jet engine portion is configured to produce an exhaust. The system further includes an auxiliary turbine having a plurality of auxiliary turbine blades. The auxiliary turbine is disposed aft of the turbine and decoupled from the shaft. The system also includes a diverter disposed between the turbine and the auxiliary turbine. The diverter is configured to selectively direct the exhaust to an inner flow path bypassing the plurality of auxiliary turbine blades or to an outer flow path engaging the plurality of turbine blades. A generator or an alternator is operatively coupled to the auxiliary turbine, and a remotely disposed motor having cooperating propeller blades, is in electrical communication with the alternator or the generator.

According to yet another embodiment of the disclose invention, a dual mode turbofan engine system is provided. The engine system includes a jet engine portion having a compressor, a turbine disposed aft of the compressor, and a shaft coupled to the compressor and the turbine. The jet engine portion is configured to produce an exhaust. The system further includes an auxiliary turbine having a plurality of auxiliary turbine blades. The auxiliary turbine is disposed aft of the turbine and decoupled from the shaft. The system also includes a diverter disposed between the turbine and the auxiliary turbine. The diverter is configured to selectively direct the exhaust to an inner flow path bypassing the plurality of auxiliary turbine blades or to an outer flow path engaging the plurality of turbine blades. A plurality of remotely located propeller blades are also provided. The remotely located propeller blades are operatively coupled to the auxiliary turbine with a shaft.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 5 is an illustration of an embodiment of the disclosed invention including a incorporated into an airframe.

FIG. 6 is a detailed illustration of an embodiment of the disclosed invention at a location along an airfoil.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
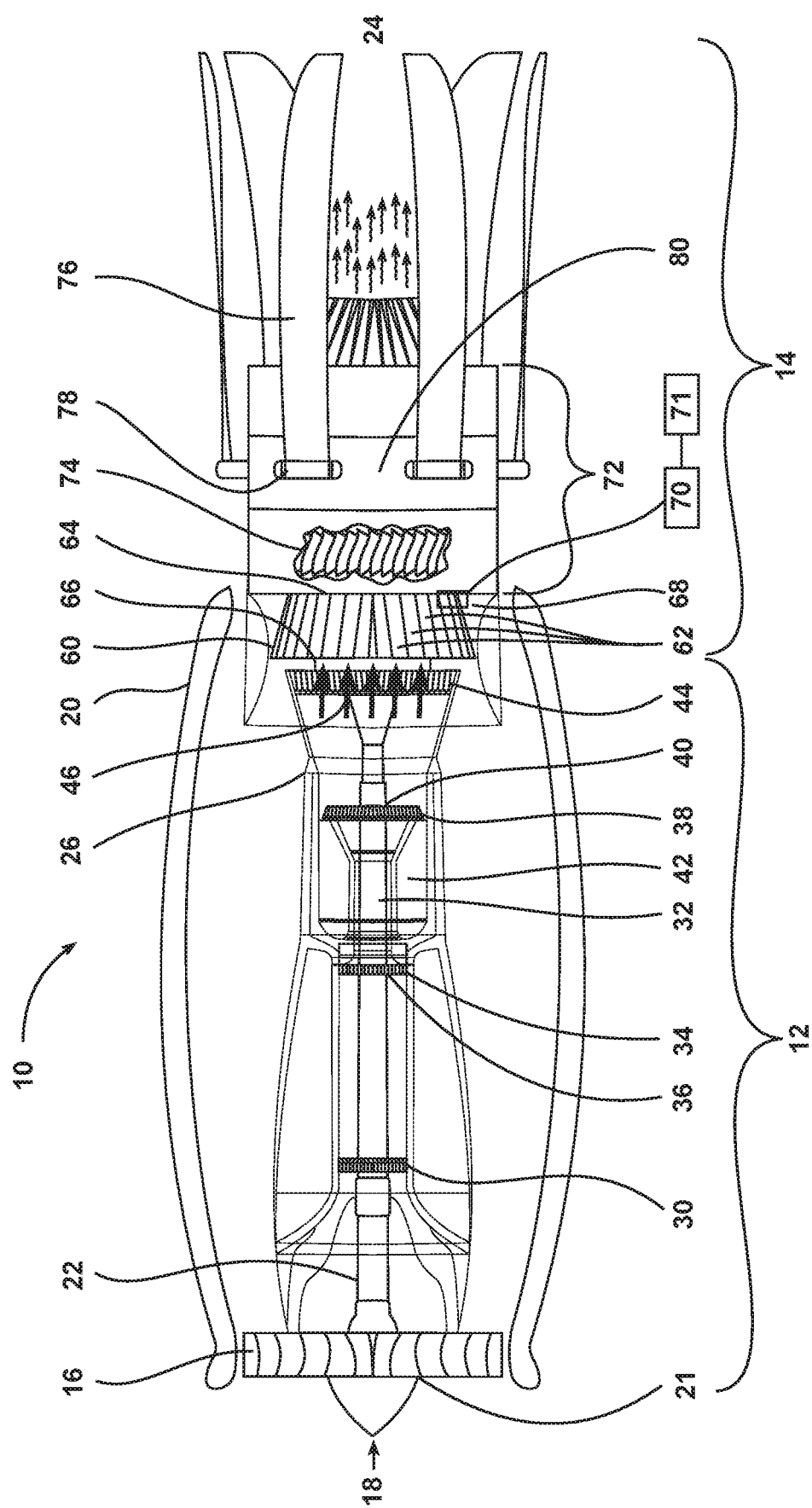
FIG. 1 is a partial cross sectional illustration of an embodiment of the disclosed invention bypassing the operation of the auxiliary turbine.

FIG. 1 is a partial cross sectional illustration of an embodiment of the disclosed dual mode turbofan engine. The engine 10, includes a jet engine portion 12, and an auxiliary portion 14. The jet engine portion 12 may be of any design as known to one of ordinary skill in the art, to include turbojet, high bypass turbofan, low bypass turbofan, or the like. In the depicted example of FIG. 1, a low bypass turbofan configuration is shown. A bypass fan 16 is disposed at the forward end 18 of the housing 20 (or nacelle for outboard engine). It is mated to the leading end 21 of low pressure shaft 22 that extends coaxially aft 24 within the housing 20 and within the core housing 26.

A low pressure compressor 30 is also mated to the low pressure shaft 22 aft 24 of the bypass fan 16. Continuing aft 24, a high pressure shaft 32 is disposed coaxial with, and exterior to, the low pressure shaft 22. A high pressure compressor 34 is mated to the first end 36 of the high pressure shaft 32. A high pressure turbine 38 is mated to the second end 40 of the high pressure shaft 32. Between the high pressure compressor 34 and high pressure turbine 38 is a combustion region 42. This combustion region includes fuel injection apparatus, and geometries conductive to ignition, as known by those of ordinary skill in the art. The final substantive component of the jet engine portion 12 is the low pressure turbine 44 mated near the trailing end 46 of the low pressure shaft 22.

The auxiliary portion 14 starts with an adjustable diverter 60. The diverter 60 may include a plurality of overlapping plates 62 configured in a frustonconical orientation. As depicted in FIG. 1, the proximal diameter 64 is substantially fixed and the distal diameter 66 is presently adjusted to be greater than the proximal diameter. While the proximal diameter 64 is substantially fixed, the orientation of the frustum of the diverter 60 can be effectively reversed by manipulating the plates 62 to establish a distal diameter 66 less than the proximal diameter 64 (as will be shown in FIG. 2.). The diverter 60 is operative to selectively direct thrust from the jet engine portion 12 to either the atmosphere, or to an auxiliary turbine 72. In the discussions that follow, it should be noted that the auxiliary turbine 72 is distinct from the high pressure turbine 38, the low pressure turbine 44, or higher order turbine (any of which may be described as simply a "turbine"). The auxiliary turbine 72 is not mated to either the low pressure shaft 22 or to the high pressure shaft 32 (either of which may be referred to simply as a "shaft").

As configured in FIG. 1, the diverter 60 has been adjusted to allow the engine 10 to operate as a low bypass turbofan. The auxiliary turbine 72 (and associated auxiliary turbine blades 74) is substantially bypassed (some amount of leakage air will escape by passing through the plates 62 or around the diverter 60.). A plurality of propeller blades 76 are shown stowed in a folded configuration by spring biased hinges 78 mounted to the auxiliary turbine shell 80. During flight, forward motion of the airframe keeps the idle propeller blades 76 swept aft, and the spring biased hinges 78 maintain the same swept configuration while the airframe is grounded. Alternatively, or in conjunction with the spring biased hinges 78, a locking mechanism may be employed to positively secure the propeller blades 76 into a swept configuration or into an extended configuration.

The plates 62 may be manipulated, and the overall shape of the frustum of the diverter 60 may be adjusted, by a mechanical actuator 68 driven by a controller 70. The actuator may be hydraulic, pneumatic, electric motor driven, the like. The controller 70 may include a sensor network 71, that is configured to receive data relative to engine operating conditions, environmental conditions, and pilot inputs. By way of example, the controller 70 may select the appropriate position of the diverter 60, based on the quantity of fuel being injected into the combustion region 42, the speed or angle attack of the airframe, the selection of an "enable" switch by the pilot, or a combination thereof. In the alternative, the pilot's selection of a diverter 60 position may override some or all of the criteria used by the controller 70 to determine an appropriate position of the diverter 60. In response to data from the sensor network, the controller 70 may send corresponding command to the actuator to manipulate the diverter 60.

Figure 2:
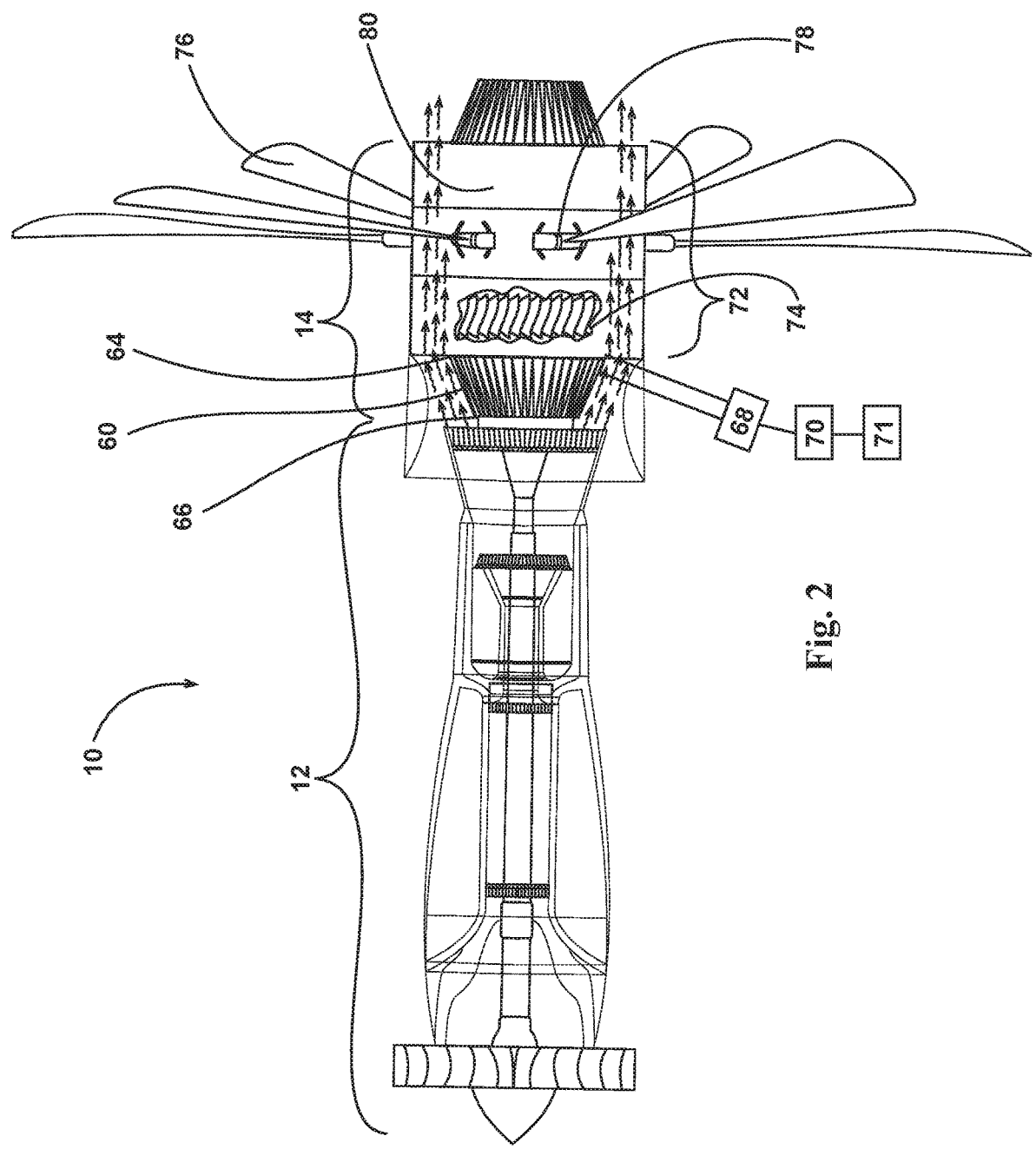
FIG. 2 is a partial cross sectional illustration of an embodiment of the disclosed invention actuating the operation of the auxiliary turbine.

Turning attention to FIG. 2, the embodiment of FIG. 1 is shown with the diverter 60 in a different configuration. In this illustration, the diverter 60 has been adjusted such that the proximal diameter 64 is larger than the distal diameter 66. In this configuration, the engine 10 operates as a propfan. The diverter 60 intercepts substantially all of the exhaust leaving the jet engine portion 12, and directs the exhaust to the auxiliary turbine blades 74 of the auxiliary turbine 72. As a result, the auxiliary turbine blades 74 and coupled auxiliary turbine shell 80 are rotated. Once the auxiliary turbine 72 (and the auxiliary turbine shell 80) rotates at sufficient speed, the propeller blades 76 overcome the spring bias of the springs 78 and are deployed substantially orthogonal to the auxiliary turbine shell 80. This configuration is particularly suited for prolonged loiter conditions, wherein the relatively low exit velocity of the propeller blades 76 closely match the forward speed of the airframe. Therefore, the design parameters of the propfan configuration can closely match low speed mission requirements (with corresponding improvements in fuel economy), and the design parameter of the turbofan configuration can be independently optimized for higher speed operations. In the absence of the dual mode turbofan engine 10, countless design compromises must be made. This results in sub optimal performance under each of several routine operating conditions.

As will be explained in the illustrations that follow, the engine 10 may be configured to allow for the remote location of propeller blades 76. In other words, the auxiliary turbine 72 will still yield auxiliary power, but the kinetic energy of the auxiliary turbine 72 may be transmitted mechanically or electrically to actuate propeller blades 76 that are not directly connected to the auxiliary turbine 80.

Figure 3:
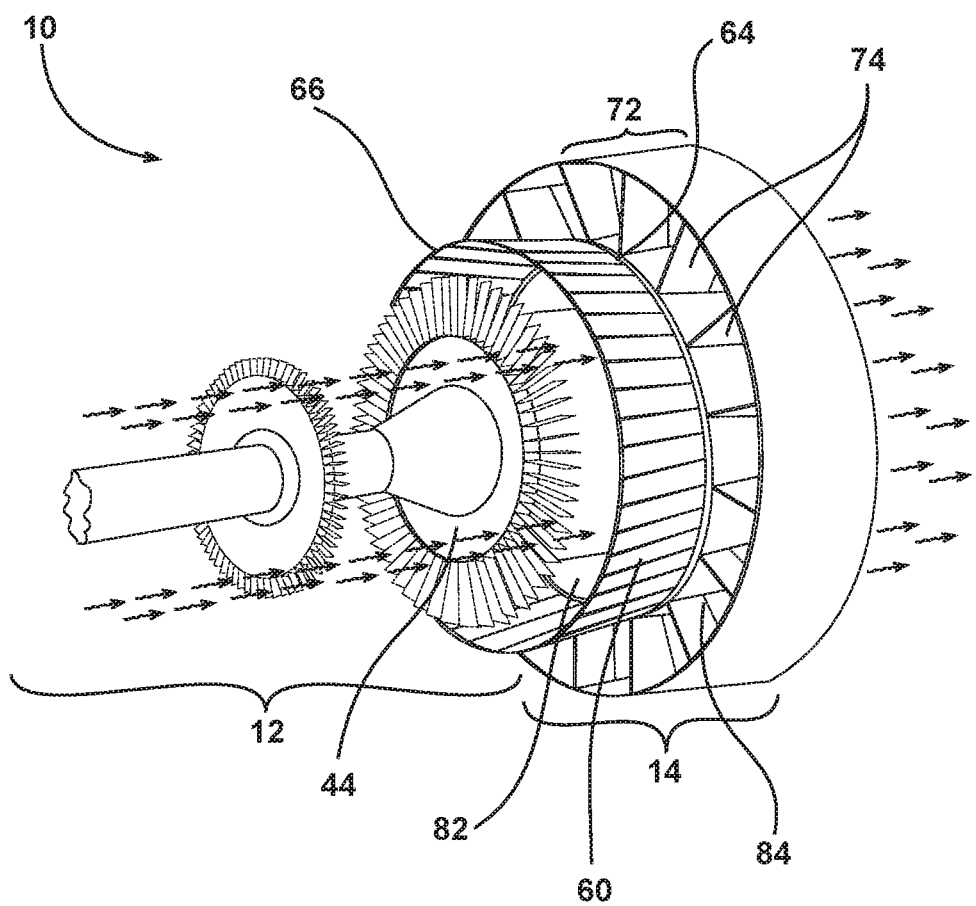
FIG. 3 is a detailed perspective al illustration of an embodiment of the disclosed invention bypassing the operation of the auxiliary turbine.

FIG. 3 illustrates a perspective detailed view of the interface between the jet engine portion 12 and the auxiliary portion 14. When the distal diameter 66 of the diverter 60 is larger than the proximal diameter 64, a funnel shaped geometry is oriented toward the low pressure turbine 44. The diverter 60 therefore intercepts substantially all of the airflow exiting the low pressure turbine 44, and directs it through the inner flow path 82. The inner flow path 82 bypasses the auxiliary turbine blades 74, and the substantially no energy is imparted to the auxiliary turbine 72. If the diverter 60 is reconfigured such that the distal diameter 66 is smaller than the proximal diameter 68, substantially all airflow is directed to the outer flow path 84. The annular column of airflow is directed to the auxiliary blades 74 of the auxiliary turbine 72, and energy is imparted thereto. In other words, the inner flow path 82 is tantamount to the flow path experienced by conventional turbojet exhaust, while the outer flow path 84 is used to rotate the auxiliary turbine 72.

Figure 4:
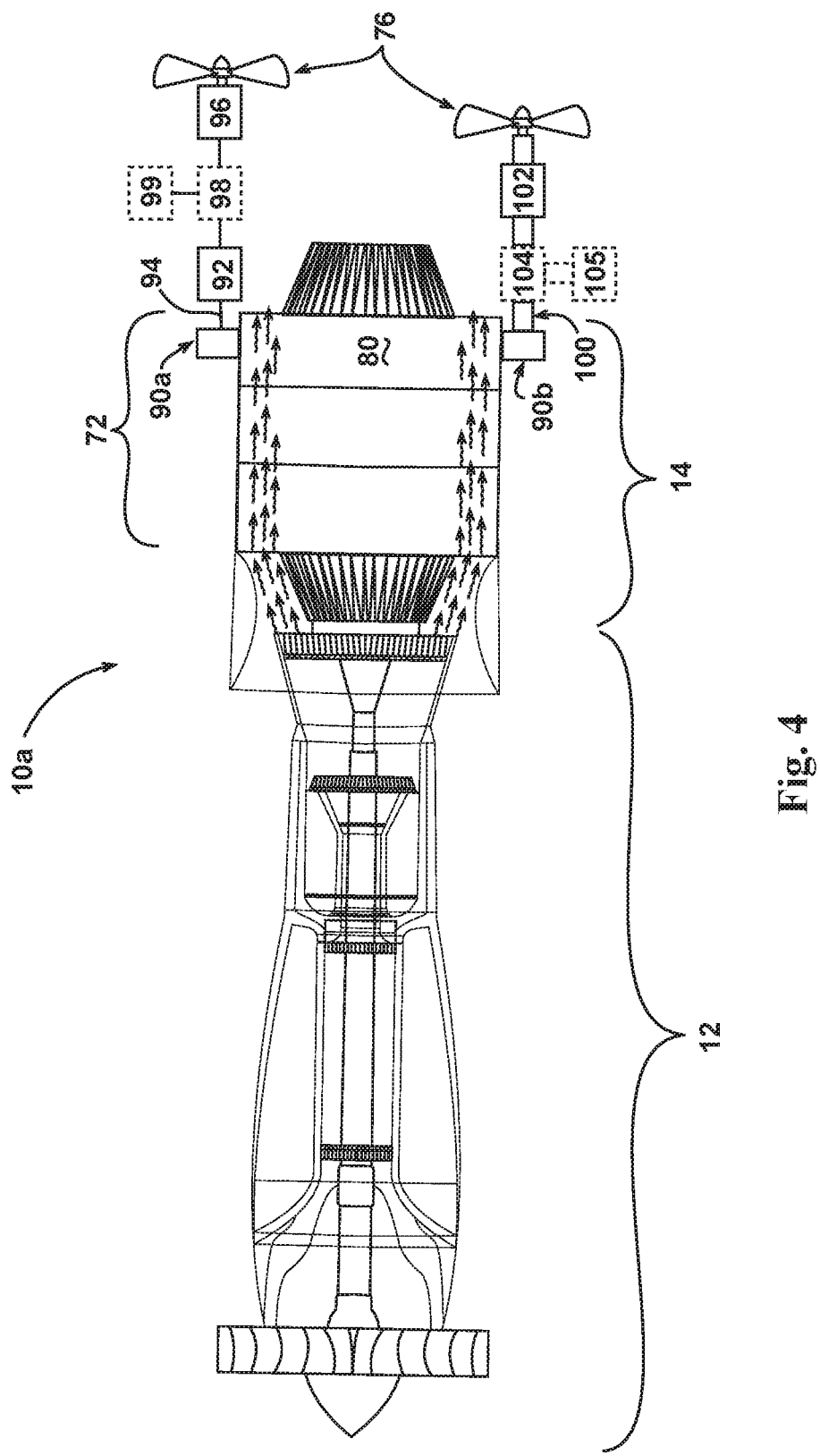
FIG. 4 is an illustration of an embodiment of the disclosed invention including a generator and remotely located motor driven propeller.

Turning attention to FIG. 4, another embodiment of the engine 10a is shown. Here, two structures for remotely locating the propeller blades 76 are shown. A power transfer 90a or 90b is used to couple the rotational energy of the auxiliary turbine shell 80 to an external feature. The power transfer 90a or 90b may be a geared interface, belt and pulley, or other cooperating features known by one of ordinary skill in the art to transfer torque. In one example, a power transfer 90a is a gear connected to a generator 92. Electrical conductors 94 operatively connect the generator 92 to a cooperating motor 96. It should be recognized that the generator 92 may be an alternator in certain embodiments. The motor 96 drives propeller blades 76 to propel the airframe. In some embodiments of the disclosed invention, a motor controller 98 may be used to regulate or adjust signals to the motor 96. The motor controller 98 may be in electrical communication with a sensor network 99 configured to capture data related to operating conditions, environmental conditions, or pilot inputs. In some embodiments, the motor controller 98 includes power storage features to compensate for loads experienced by the motor 96, or to energize the motor 96 during power interruptions.

In another embodiment, the power transfer 90b may be a geared interface coupled to one or more shafts 100. The shafts 100 may use one or more directional elements 102 to transfer power to other shafts 100 that are not coaxial with the power transfer 90b. For example, the directional elements may be universal joints, continuous velocity joints, beveled gears, belts and pulleys, or the like. In some embodiments, mechanical power controllers 104 are employed to adjust the speed or torque of the power transfer 90b to the propeller blades 76. For example, clutches, gears, propeller blade 76 pitch adjusting structures, or other mechanical devices may be used to vary the conditions of the propeller blades 76 with respect to the auxiliary turbine 72. While the power transfers 90a and 90b are depicted as interfacing with the auxiliary turbine shell 80, one of ordinary skill in the art may modify the contact point based on design constraints. In essence, the power transfers 90a and 90b allow the propeller blades 76 to located at a distance from the jet engine portion 12 and auxiliary portion 14 (as will be described below).

In one exemplary embodiment, the engine 10a is configured as shown in FIG. 5. A engine jet engine portion 12a and auxiliary turbine portion 14a are used to energize a plurality of propeller blades 76 disposed at an intermediate position of the airfoil 110. This intermediate position of the airfoil 110 may coincide with the boundary region 112 of the top surface 114 of the airfoil 110. The boundary region 112 is coincident with the location wherein laminar air transitions to turbulent air. Locating the propeller blades 76 near the boundary region 112 allows for drag reducing boundary suction and wake augmentation. In the illustrated configuration, the propeller blades 76 pass through windows 116 in the airfoil 110. In some embodiments, the propeller blades 76 may be disposed forward 118 or aft 120 of the boundary region 112. It should also be noted that while the illustrated depiction shows a single jet engine portion 12a energizing a four propeller locations 122 (via motors 96 or shafts 100, not shown), the number of jet engine portions 12a may be greater than, less than, or equal to the number of propeller locations 122, depending on deign goals and constraints. The configuration of FIG. 5 allows one or more jet engine portions 12a to power the airframe in a turbojet configuration for higher speed applications, while one or more propeller locations 112 provides lower propulsion for loiter roles.

Turning attention to FIG. 6, a detailed view of one propeller location 122 along the airfoil 110 is shown. The propeller blades 76 are shown stowed with the airfoil 110 when they are not energized. When stowed, the propeller blades 76 do not penetrate the window 116, and a shutter 130 is employed to occlude the window 116 and to provide aerodynamic continuity to the airfoil 110. A shutter 130 and window 116 (not shown) are also located on the bottom surface 132 of the airfoil 110.

Figure 7:
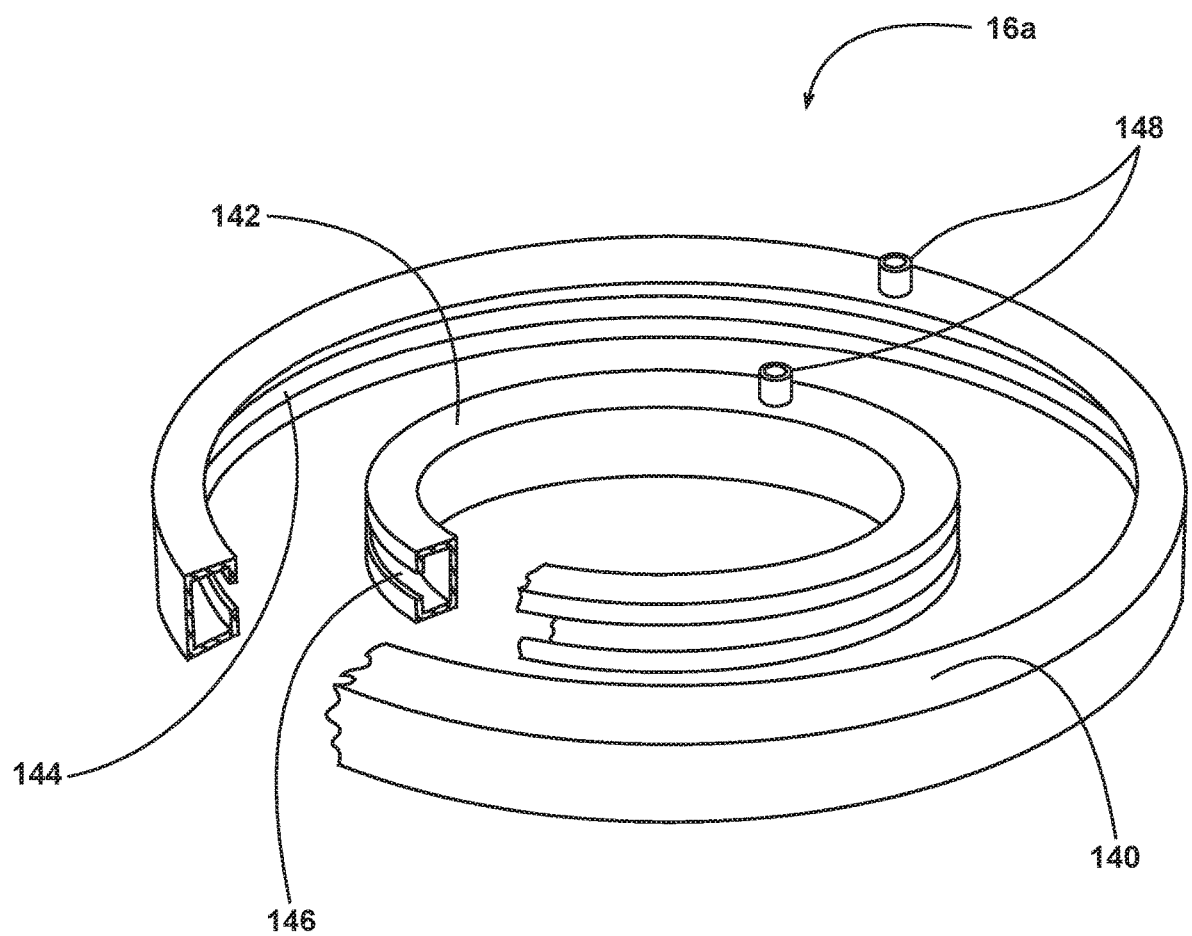
FIG. 7 is an illustration of a fluidic structure of the disclosed invention.
Figure 8:
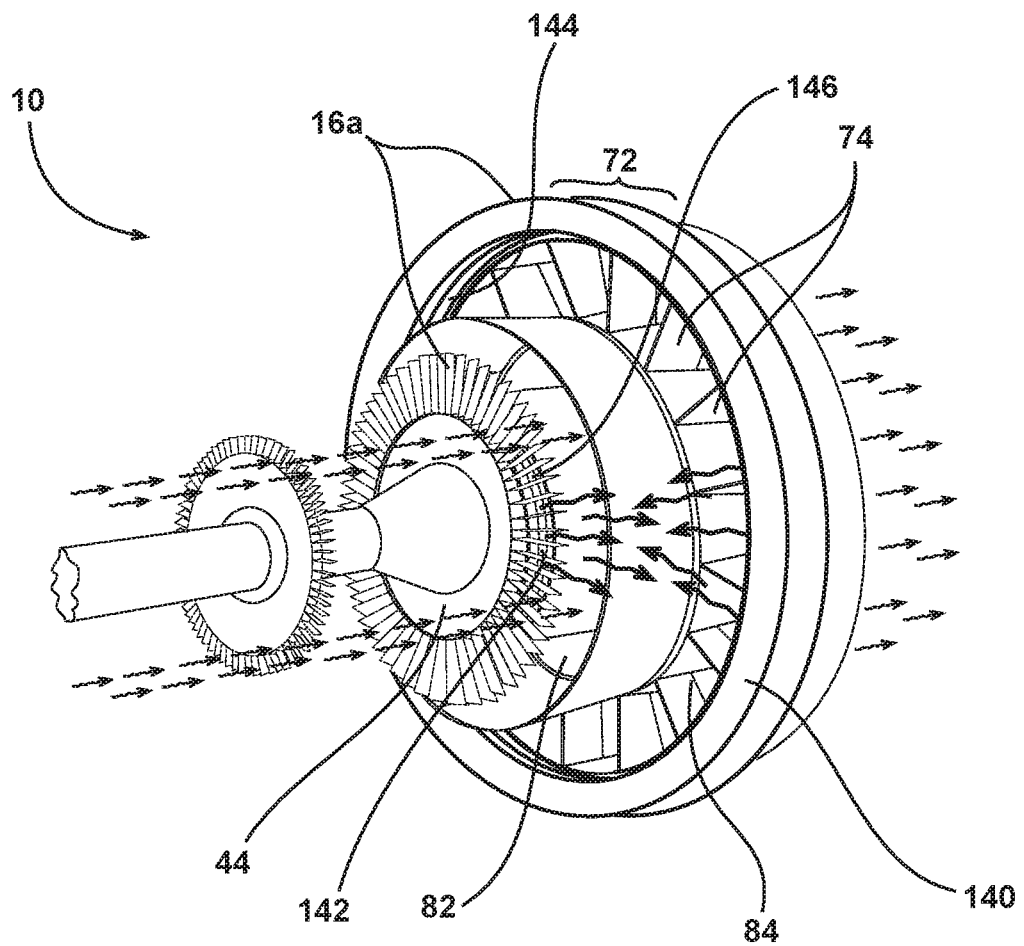
FIG. 8 is an illustration of a fluidic structure of the disclosed invention disposed between the jet engine portion and the auxiliary turbine.

Turning attention to FIGS. 7 and 8, in some embodiments of the disclosed invention, the diverter 16a may be comprised of one ore more fluidic elements. In the depicted example, a major ring 140 and minor ring 142 form the diverter 16a. The major ring 140 has an inwardly facing major exhaust annulus 144, and the minor ring 142 has an outwardly facing minor exhaust annulus 146. Bleed air pumped into the major ring 140 and minor ring 142 via ports 148, are exhausted through the major exhaust annulus 144 and minor exhaust annulus 146, respectively. In one embodiment, the major ring 140 and minor ring 142 are disposed as depicted in FIG. 8. To energize the auxiliary turbine 72, bleed air is introduced into the port 148 of the minor ring 142. The outwardly escaping bleed air intersects with exhaust gasses leaving the low pressure turbine 44, and is forced radially outward into the outer flow path 84. Conversely, to bypass the auxiliary turbine 72, and to operate as a turbojet, bleed air is introduced into the port 148 of the major ring 140. Bleed air escaping the major exhaust annulus 144 directs exhaust gasses radially inward and into the inner flow path 82. In this way, the diverter 16a manipulates airflow without the use of moving parts. In other embodiments, the fluidic elements may include exit guide vanes disposed at the aft stator portion of low pressure turbine 44. In those embodiments conventional low pressure turbine 44 stator exit guide vanes are modified to selectively directed exhaust flow to the inner flow path 82 or outer flow path 84.

Through preliminary conceptual design analysis, including constraint and mission analysis for a dual mode system, such a system could loiter for 24 hours efficiently and then dash to supersonic Mach of 1.8. This analysis took advantage of a morphing aircraft to compliment the variable configuration capability of the engine. These simulations further indicated that disclosed invention may yield fuel savings of 40%. Additionally, risk reduction studies have been conducted using prototypes that are meeting expectations for the class of motor currently under investigation.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A dual mode turbofan engine system, the engine system comprising:
   a jet engine portion having a compressor, a turbine disposed aft of the compressor, and a shaft coupled to the compressor and the turbine, wherein the jet engine portion is configured to produce an exhaust;
   an auxiliary turbine having a plurality of auxiliary turbine blades, wherein the auxiliary turbine is disposed aft of the turbine and decoupled from the shaft;
   a diverter disposed between the turbine and the auxiliary turbine, wherein the diverter is configured to selectively direct the exhaust to an inner flow path bypassing the plurality of auxiliary turbine blades or to an outer flow path engaging the plurality of turbine blades; and
   a plurality of propeller blades hingedly connected to the auxiliary turbine;
   wherein the diverter is an adjustable frustoconical structure, and the diverter includes a plurality of overlapping plates.

2. The system of claim 1, wherein each of the plurality of propeller blades are spring biased to a swept position, wherein said spring bias is overcome when the auxiliary turbine is actuated.

3. The system of claim 1, wherein each of the plurality of propeller blades are selectably lockable in either a retracted or an extended position.

4. The system of claim 1, wherein the diverter includes a fluidic structure configured to direct the exhaust to the inner flow path or to the outer flow path.

5. The system of claim 4, wherein the fluidic structure is a ring or nozzle ring having an exhaust annulus oriented radially inward or radially outward from the ring.

6. A dual mode turbofan engine system, the engine system comprising:
   a jet engine portion having a compressor, a turbine disposed aft of the compressor, and a shaft coupled to the compressor and the turbine, wherein the jet engine portion is configured to produce an exhaust;
   an auxiliary turbine having a plurality of auxiliary turbine blades, wherein the auxiliary turbine is disposed aft of the turbine and decoupled from the shaft;
   a diverter disposed between the turbine and the auxiliary turbine, wherein the diverter is configured to selectively direct the exhaust to an inner flow path bypassing the plurality of auxiliary turbine blades or to an outer flow path engaging the plurality of turbine blades;
   a generator or an alternator operatively coupled to the auxiliary turbine; and
   a remotely disposed motor having cooperating propeller blades, wherein the remotely disposed motor is electrical communication with the alternator or the generator;
   wherein the diverter is an adjustable frustoconical structure including a plurality of overlapping plates.

7. The system of claim 6, wherein the diverter includes a fluidic structure configured to direct the exhaust to the inner flow path or to the outer flow path.

8. The system of claim 7, wherein the fluidic structure is a ring or nozzle ring having an exhaust annulus oriented radially inward or radially outward from the ring.

9. The system of claim 7, wherein the compressor includes a stator having an aft end, and wherein the fluidic structure is a plurality of exit guide vanes disposed proximate the aft end of the stator.

* * * * *

UNITED STATES PATENT AND TRADEMARK OFFICE
CERTIFICATE OF CORRECTION

PATENT NO. : 10,711,791 B1  
APPLICATION NO. : 16/103291  
DATED : July 14, 2020  
INVENTOR(S) : August J Rolling et al.

Page 1 of 1

It is certified that error appears in the above-identified patent and that said Letters Patent is hereby corrected as shown below:

On the Title Page

Item (72) Inventor:
"Jeffrey K Wood" should be "Jeffre K Wood."

Signed and Sealed this
Sixteenth Day of January, 2024

Katherine Kelly Vidal
*Director of the United States Patent and Trademark Office*